United States Patent Office 3,555,602
Patented Jan. 19, 1971

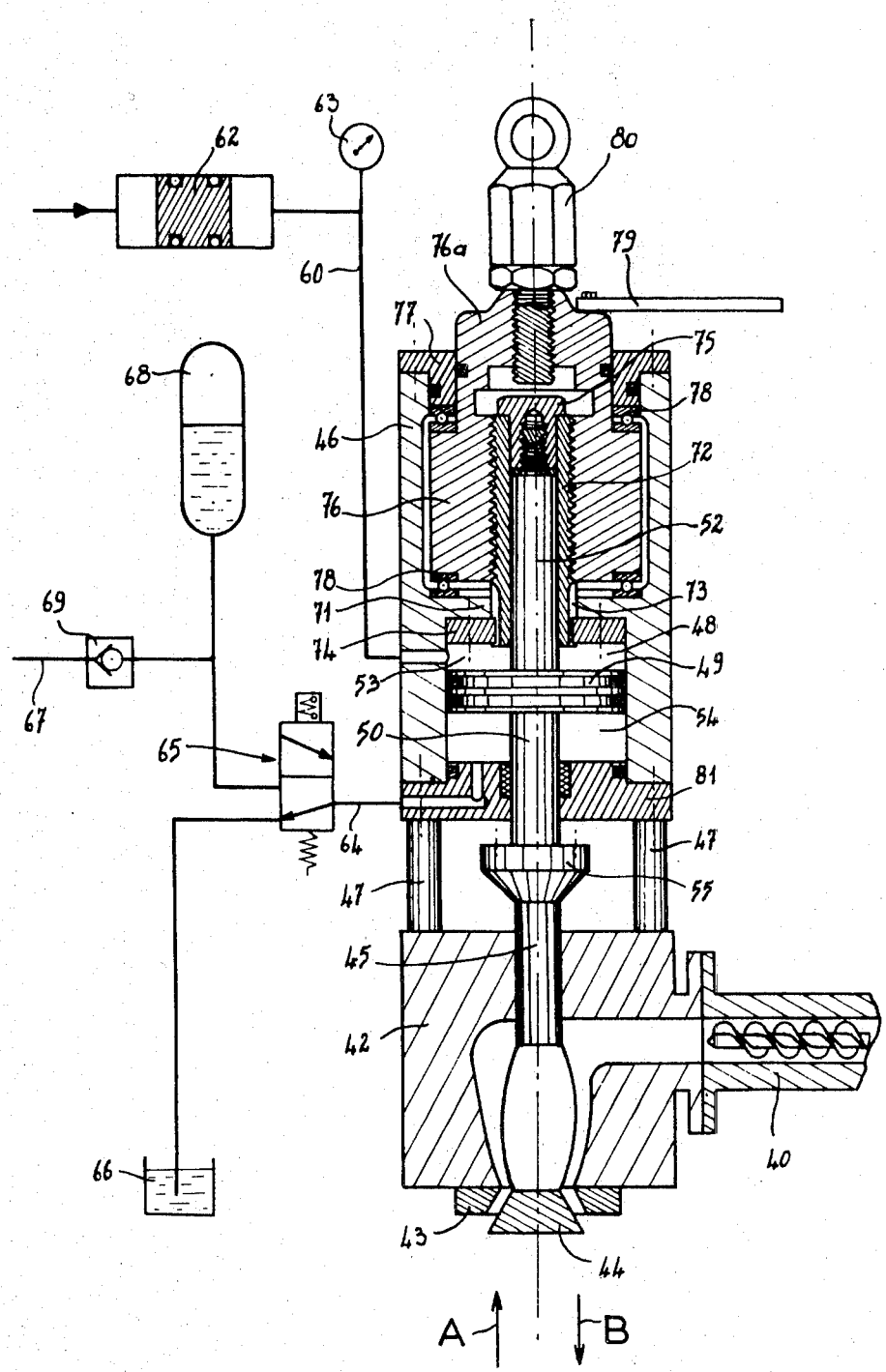

3,555,602
DEVICE FOR CONTROLLING OPENING AND CLOSING MOVEMENTS OF AN ADJUSTABLE EXTRUSION DIE
Jacques Bourgeois, Lyon, France, assignor to "Elco" Société d'Exploitation Lesieur, Cotelle et Foucher, Paris, France
Filed June 7, 1968, Ser. No. 735,301
Claims priority, application France, June 12, 1967, 48,769
Int. Cl. B29d 23/04
U.S. Cl. 18—14
5 Claims

ABSTRACT OF THE DISCLOSURE

In an extrusion machine having a die with an adjustable mandrel for extruding hollow articles, a system is provided for adjusting the position of the mandrel. The system comprises a double acting piston and cylinder, the piston of which is connected to the mandrel and which is urged into a position where the die has a maximum opening, means for quickly closing the die by forcing the piston away from said position and screw means associated with the piston for adjusting the degree of maximum opening and closing of the die.

---

The present invention relates to a device for controlling opening and closing movements of an adjustable extrusion die, and more particularly for controlling the thickness of an extruded parison and for effecting instantaneous attentuation thereof for its separation from oncoming extrudate.

In the production of hollow units of plastic material, having substantial changes in diameter, the thickness of the so-called parison must be caused to vary at the outlet of the extrusion press so that its wall thickness remains substantially constant despite differences in diameter from one section to another of the hollow unit.

This variation is produced as a rule by displacing a conical mandrel within the extrusion die. Since the parison issues from the latter under relatively high pressure, a substantial vertical force must be applied to the mandrel to displace the same against this parison.

The devices employed to vary the parison, at present, employ the force of a hydraulic ram for this purpose, but this process is relatively costly and complex.

A device of satisfactory nature is described however in the French Pat. No. 1,500,288 of Sept. 12, 1966.

It is known moreover that in the processes for the production of hollow units by the extrusion and inflation process, a portion of tube of softened plastic material referred to as parison and discharged from a die fed by an extrusion press, is enclosed in a two-piece mold. It is also known that, as a rule, the extrusion process is continuous and that the portion of parison intended to form the hollow unit is separated at a given instant from the continuously extruded tube.

Numerous devices have been envisaged for the purpose of performing this separation. If the inflation of the hollow unit is performed by means of a reed inserted into the parison on closing the mold, the freestanding extremity of the latter should remain appropriately open to fit the reed correctly. The part of the hot softened tube intended to form the freestanding extremity of the next parison should not, therefore, have undergone any considerable deformation by the preceding separating operation, which should not moreover cause the edges of a tube of semimolten material to stick together under compression.

Being torn off by means of the edges of the mold, on closing and withdrawing the mold, as a rule causes a harmful elongation of the parison and causes its edges to stick together.

Devices have been envisaged, comprising cutting blades or heated blades, as well as pincers transferring the parison into the mold.

All these devices have the disadvantage of performing the severing of the parison at a relatively great distance from the upper extremity of the mold. The mold blank comprises not only the part clamped in the mold, but equally a part which is not molded, and which entails many shortcomings during subsequent operations and may cause considerable waste, specifically owing to its high temperature, the external part not having been affected by cooling by the mold. The severing devices moreover entail mechanical, pneumatic and electrical complications.

The object of the present invention is to obviate these shortcomings. To this end, it relates to a device which, in combination, comprises devices for controlling the thickness of the parison as described in the aforesaid French patent, and devices arranged to cause its attenuation instantaneously and at the instant required, in order to facilitate its separation.

On the one hand, to control the thickness of the parison, this device comprises a pneumatically operated screw or helix system which is organized so that a small force engenders a substantial axial force on the mandrel or on the die to reduce the parison passage section to the required value, and on the other hand, for instantaneous actuation of the attenuation of the parison, a piston keyed on the actuating rod of the mandrel of the extrusion head and displaceable in a cylinder whose rear chamber is fed with fluid under constant pressure and whose front chamber may be fed instantaneously with fluid under a higher pressure than the first, the said mandrel actuation rod being slidingly situated within the screw or helix system between two abutments, the fixed but adjustable rear one determining the value of the attenuation of the parison and the other one at the front being solidary with the screw system.

According to a preferred form of embodiment of the invention, the actuating rod of the mandrel of the extrusion head is connected to the front rod of a double-rod piston displaceable in a hermetic cylinder whose rear chamber is connected to the hydraulic chamber of an air/oil pressure exchanger and whose front chamber is connected to an electromagnetic valve which, depending on whether it is de-energized or energized, places it in communication with the tank or with a hydraulic circuit whose pressure exceeds that of the rear chamber by a value such that the piston is displaced rearwards while entraining the mandrel with sufficient force to oppose the extruding force, the rear rod of the double-rod piston whose free extremity carries a collar or the like forming its front abutment being slidingly arranged in a threaded sleeve which is immobilized in rotation and screwed into a nut, the latter being immobilized in translation and its rotation being performed by means of a lever keyed to the same and actuated by means of a pneumatic ram provided with a programmed feed.

A form of embodiment of this device is shown in axial section in the sole accompanying drawing.

In this drawing, 40 indicates the extremity of a screw or helix extrusion press 42, comprising an extrusion head curving at right angles and comprising a die 43 and a mandrel 44. This mandrel is secured to the lower extremity of a cylindrical rod 45 arranged to slide vertically within the unit 42.

A control box or case 46, secured by means of posts 47 screwed into the head 42 is situated above the extrusion head 42.

This case 46 comprises a hermetic cylinder 48, in which is displaceable a piston 49 possessing two rods 50 and 52, which divides it into two chambers, being a rear chamber 53 and a front chamber 54.

The front rod 50 of the piston traverses the front part of the cylinder 48, through bores lined with sealing joints and is fixed with the rod 45 of the mandrel 44 by means of a fitting device 55.

The rear chamber 53 of the cylinder 48 is connected by means of a pipe 60 to the oil chamber of an air-oil pressure exchanger 62 whose air chamber is connected to the source of compressed, filtered and lubricated air. The presure $p$ constantly prevailing in this rear chamber 53 may be read off on a pressure gauge 63.

The front chamber 54 of the cylinder is connected by a pipe 64 to a two-position electromagnetic valve 65 which places this chamber in communication with the tank 66 when it is in the idle condition as shown in the drawing.

By contrast, when its solenoid is energized, its slider is displaced and places the aforesaid chamber in communication with the hydraulic circuit 67 of the inflation system. An accumulator 68 and a non-return valve 69 are incorporated in this circuit.

The rear rod 52 of the piston 49 is slidingly arranged in a threaded sleeve or the like 72 whose front part is equipped with splines 73 preventing it from turning by fitting into complementary splines wrought in an element 74 screwed beneath the radial side of the case 46.

On the stepped and threaded rear extremity of the rod 52 is screwed an end-piece comprising a flange 75 of greater diameter than that of the said rod which bears on the rear extremity of the sleeve 72 when the electromagnetic valve is not energized and has the function of the front abutment of the device.

The sleeve 72 is screwed into a stepped nut 76 immobilized in translation by a cover 77 which by being affixed on the case 46, holds it against the rear face of the radial side 71 with intercalation of axial ball bearing abutments 78. The rear part 76a of this nut 76 in sealed manner traverses the cover 77 to receive a lever 79 which may be actuated by a pneumatic ram, which is not shown, in such manner as to cause the nut 76 to pivot.

At its center, the part 76a also comprises a tapped hole into which is screwed an adjustable stop 80 against whose front extremity may bear the rear face of the flange 75 fixed with the rod 52.

In this device, the nut 76 may thus turn freely about its longitudinal axis, without being free to be displaced axially, whereas the sleeve 72 can be displaced longitudinally without being free to turn.

As a result, depending on the direction of rotation of the nut 76, and thus on whether the rod 79 is displaced angularly in one direction or the other by the pneumatic ram, the threaded sleeve 72 undergoes a translatory displacement in the direction of the arrow A or of the arrow B.

When the nut 76 turns in the direction corresponding to displacement in the direction of the arrow A of the threaded sleeve 72, this latter bears on the flange 75 of the end-piece of the rod 52, thus entraining the piston 49 and the mandrel 44. It is apt to point out that the mechanical effort imparted to this piston by the threaded sleeve 72 should be adequate to counter the opposing force resulting from the action of the pressure $p$ coming from the pressure converter 62 and applied to the rear face of the piston 49 in the chamber 53.

During this very gradual movement, the front chamber 54 of the cylinder is filled automatically by suction with oil from the tank 66 through the pipe 64, since the electromagnetic valve is in the idle condition as shown in the drawing.

The displacement of the mandrel 44 in the direction of the arrow A is controlled precisely as a function of the required attenuation of the parison, by screwing or unscrewing the stop 80 to a greater or lesser degree.

When the nut 76 turns in the direction corresponding to the displacement of the threaded sleeve 72 in the direction of the arrow B, the pressure $p$ continually prevailing in the chamber 53, that is to say on the rear face of the piston 49, impels this latter in the direction of the arrow B and applies the flange 75 of the end-piece secured on its rod 52 against the rear extremity of the sleeve 72, so that in step with its descent, the piston 49 and the mandrel 44 also descend.

These very progressive displacements of the piston and of the mandrel are advantageously controlled by means of a distributor governing the feed to the pneumatic ram according to a definite program determined beforehand.

For instantaneous reduction of the thickness of the parison issuing from the extrusion head 42, for the purpose of severing the same, it is sufficient to energize the solenoid of the electromagnetic valve 65, the oil contained in the oleopneumatic accumulator 68 under a pressure P higher than the pressure $p$ prevailing in the chamber 53, then immediately penetrates into the chamber 54 of the cylinder and raises the piston 49 until the rod 52 of this latter comes into contact with the stop 80. This translation of the piston 49 in the direction of the arrow A brings the lower extremity of the mandrel 44 close to the corresponding part of the die 43 and causes a reduction of the passage duct of the parison, for a very short time, without however allowing the conical parts of the mandrel and of the die to come into contact which could damage these.

This practically total closing of the extrusion duct is advantageously initiated at a given instant in the operating cycle of the inflating machine, in such manner that the attenuated section of the parison is situated at the point selected for severance, and for example closest to and outside the outer edges of the mold and at the instant of approach and of clamping of the elements of the mold.

By virtue of the pressure applied permanently on the screw in the downward direction from the top, except during the short period of momentary attenuation, the system operates in the manner of an automatic take-up of the play of the screw in its nut, thereby endowing the progressive control with very high precision. By virtue of the splined part of the screw 72 and of its counterpart, the washer 74, there is no seal between the part of the cylinder 48 forming the front cavity of the case and the rear cavity containing the nut and the threaded sleeve. As a result, this rear cavity is always full of oil, so that all the mechanical displacements occur in an oilbath, thereby ensuring very great smoothness of operation and a substantial limitation of the wear of the moving parts, which cannot jam.

Joints or packings ensure a seal between the base 81 and the case 46 and between this base and the rod 50.

Analogously, joints or gaskets ensure a seal between the cover 77 and the case 46 on the one hand, and the rear part of the control nut 76 on the other hand.

It is apt to point out moreover that the device for momentary attenuation of the parison described in respect of its application for separation of the part of the parison caught in the mold from the part in process of extrusion, may equally be applied to facilitate the separation of the units produced by inflation in molds arranged for multiple superimposed impressions.

The invention is evidently not limited to the forms of embodiment described hereinbefore by way of example only. It may, on the contrary, be applied in all modified forms of embodiment and of application without thereby exceeding its scope.

I claim:

1. A device for controlling opening and closing movements of an adjustable extrusion die comprising a cylinder, a piston adapted to move in the cylinder to operate a movable member of the die, first stop means for preventing movements of the piston in the cylinder in one direction beyond a first terminal position, second stop means for preventing movement of the piston in the cylinder in the opposite direction beyond a second terminal position, screw means associated with the first stop means for adjusting the position of the first stop means and hence of said first terminal position upon rotation of the screw means, fluid supply means for continuously applying pressure to said piston to urge said piston to said first terminal position and means for selectively overcoming said pressure and forcing said piston away from said first terminal position to said second terminal position.

2. A device as claimed in claim 1 wherein said piston includes a rod projecting from the cylinder, said rod terminating in a flanged collar, said first stop means comprising an externally threaded sleeve surrounding said rod, said flanged collar being adapted to bear against an end surface of said sleeve in said first terminal position of the piston, said screw means comprising a nut threadedly receiving said sleeve, and means constraining said nut against axial movement whereby rotation of the nut effects axial movement of the sleeve to adjust said first terminal position of the piston.

3. A device as claimed in claim 1 wherein said second stop means is provided externally of said cylinder.

4. A device as claimed in claim 1 wherein said second stop means is adjustable to alter said second terminal position of the piston.

5. A device as claimed in claim 1 wherein said means for continuously applying pressure to said piston comprises means for continuously supplying pressure fluid at a first pressure to said cylinder on one side of said piston, and said means for selectively overcoming said pressure comprises means for selectively introducing pressure fluid at a pressure higher than said first pressure to said cylinder on the other side of said piston and means for exhausting said cylinder on said other side of said piston.

References Cited

UNITED STATES PATENTS

| | | | |
|---|---|---|---|
| 3,147,515 | 9/1964 | Amsden | 18—14 |
| 3,205,534 | 9/1965 | Langecker | 18—14 |
| 3,245,111 | 4/1966 | Branscum | 18—14X |
| 3,386,132 | 6/1968 | Fischer | 18—14 |

JAMES M. MEISTER, Primary Examiner